Sept. 1, 1964     T. C. McGOW ETAL     3,146,874
MECHANICAL SELECTION DEVICE FOR CONVEYORS
Filed April 3, 1961     4 Sheets-Sheet 1
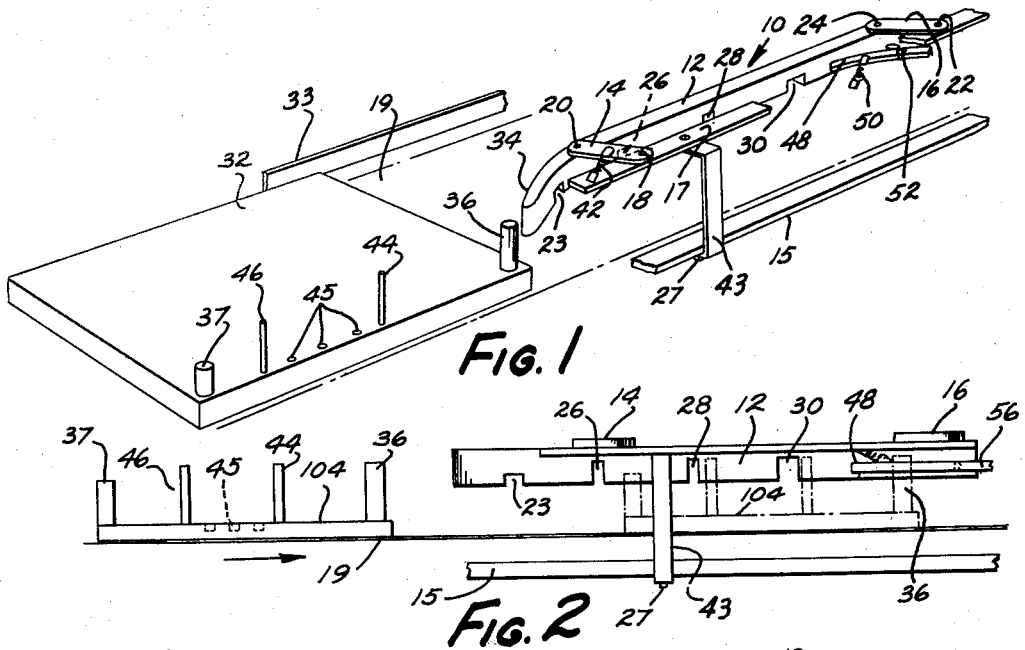
FIG. 1
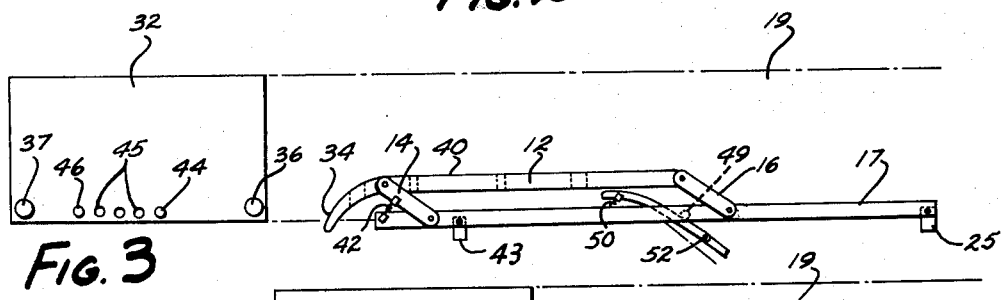
FIG. 2
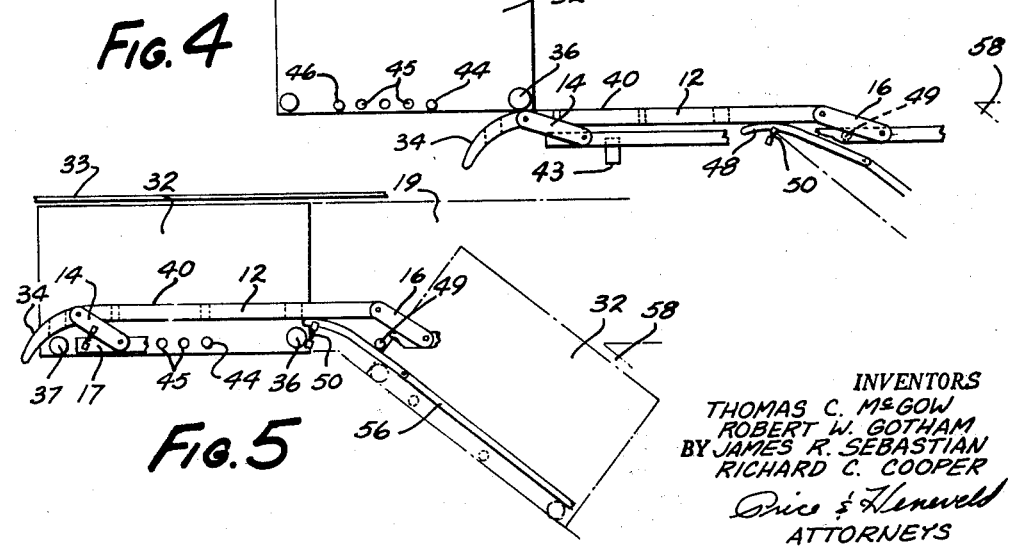
FIG. 3
FIG. 4
FIG. 5
INVENTORS
THOMAS C. McGOW
ROBERT W. GOTHAM
BY JAMES R. SEBASTIAN
RICHARD C. COOPER
ATTORNEYS

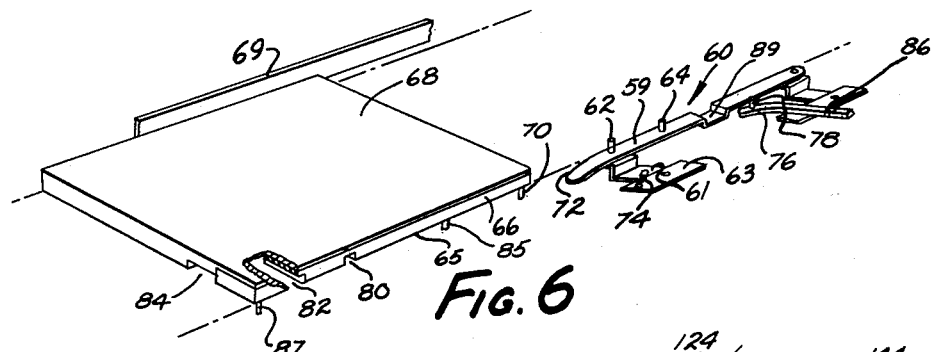

INVENTORS
THOMAS C. McGOW
ROBERT W. GOTHAM
BY JAMES R. SEBASTIAN
RICHARD C. COOPER

ATTORNEYS

INVENTORS
THOMAS C. McGOW
ROBERT W. GOTHAM
BY JAMES R. SEBASTIAN
RICHARD C. COOPER

ATTORNEYS

United States Patent Office 3,146,874
Patented Sept. 1, 1964

3,146,874
MECHANICAL SELECTION DEVICE FOR
CONVEYORS
Thomas C. McGow, Summit, and Robert W. Gotham, Plainfield, N.J., and James R. Sebastian, Grand Rapids, and Richard C. Cooper, Ada, Mich., assignors to The Rapids-Standard Company, Inc., Grand Rapids, Mich., a corporation of Michigan
Filed Apr. 3, 1961, Ser. No. 100,085
9 Claims. (Cl. 198—38)

This invention relates to conveyors, and more particularly to a mechanism for reading pre-set codes on passing carriers and causing a reaction to occur in respect to a particular carrier selected from the other carriers, especially the diversion of the particular carrier from the conveyor on which it is traveling.

Preselection and carrier diverting mechanisms of the prior art range from the very simple to the very complex. The simple devices characteristically effect only the most elementary operations, and further are adaptable only to certain types of conveyors. Their use is thus very limited. In high speed manufacturing, automated warehousing, and other industries where elaborate conveying and routing systems are so important, highly complex preselection and diverting mechanisms are therefore presently necessarily adopted. These may involve a reader having a series of independent reciprocable pins which, when properly actuated, close a series of electrical switches to activate an independent diverting electrical solenoid system; or may involve a carefully arranged and delicate magnetic coding and reading apparatus to actuate an electrical control network for a diverter; or may involve any number of other complex systems on the market today.

Users of automated conveyor systems therefore must either purchase very elaborate, expensive, and complicated preselection and diverting mechanisms, or must supplement the simple and functionally limited type with manual labor due to the present lack of a preselection mechanism which possesses in combination the several attributes of (1) simplicity, (2) reliability, (3) operational versatility for adaptation to different types of conveyed articles and/or different types of conveyors, (4) functional versatility to produce various desired reactions, (5) flexibility of attachment to allow quick, simple relocation of the selector on the conveyor, and (6) operational smoothness.

A need has existed in this art for a basic conveyor selection mechanism within which could be compatibly combined all of these features. This need has become urgent in recent years due to the greatly increased automation in manufacturing, warehousing, and other industries, where the resulting complex conveyor traffic control systems must be very flexible and capable of quick performance, but must approach the ultimate in simplicity so as to be free from costly failures and to be useable in great numbers without undue expense.

In the prior art devices, not only are the preselection and diverter mechanisms limited and usually complex and expensive, but also the reader generally acts only as a trip for a set of stopping and tripping devices or a separate and independently powered diverting mechanism such as an electrical solenoid or the like. To provide auxiliary power equipment is undesirable due to factors of cost, space consumption, maintenance, down-time failures, and others. Further, the use of delicate mechanical tripping arms is not satisfactory for heavier carriers and loads. In addition, it is not desirable to bring moving carriers having substantial weight to a stop before rerouting. The rerouting or diverting device should be able to receive energy directly from the passing carrier and deflect the still moving carrier gradually and continuously from the conveyor.

In many instances, it has been highly desirable to eliminate the necessity for an independently power diverter for economic and space saving reasons, among others. This conveivably could be accomplished by using energy of the passing carrier or alternatively of the powered member of the conveyor itself, but heretofore no simple effective reader capable of combining the reading and diverting functions into one device by transmitting the carrier or conveyor movement to the reader has been devised. The energy needed to divert the carrier should be transmitted through the carrier to the diverter rather than any direct connection between the moving portion of the conveyor and the diverter. This enables the diverter to be equally useful on gravity or power conveyors and to be very simple in structure. Such a reader not only simplifies the diverter construction to a marked degree but costs only a fraction of that of conventional constructions, can be relocated on the conveyor without the problem of moving attached power means, has little maintenance, and can be used where no extra power source is available.

Such a reader combined with a code means that can be set easily and quickly and has a large number of code combinations, has a wide range of applications. This is especially true in a structure having no electrical switching or complex magnetic coding.

It is therefore the objective of this invention, among others, to provide a mechanical reading and selection device for conveyors which combines the above desirable characteristics. It provides such a device which is both simple and inexpensive. It is adaptable to a wide range of conveyors, both powered and gravity. It is capable of utilizing the energy of the article carriers either to effect the code reading process alone or in addition to effect removal of the article carrier from the conveyor. In either case it is capable of causing the carrier to be removed from the conveyor without auxiliary power means.

The objectives of this invention also include a structure of compact construction capable of rapid and simple relocation along the conveyor. It provides a self-contained or packaged unit requiring little or no reworking of the conveyor for either installation or removal. Despite the simplicity and the reduction in cost, this invention provides a selection system capable of a wide range of code variations. The code is capable of quick and simple resetting.

These and many other objects will be apparent to those in the art upon studying the following specification in conjunction with the drawings in which:

FIG. 1 is a perspective view of the reading and selection mechanism of this invention illustrating the cooperating code bearing carrier;

FIG. 2 is an elevation view of the conveyor, selection member and code bearing carrier illustrated in FIG. 1;

FIG. 3 is a plan view of the apparatus illustrated in FIG. 1 showing the approaching carrier and the guarded diverter behind the selection member;

FIG. 4 is a plan view of the apparatus illustrated in FIG. 3 with the reader bar of the selection member being depressed by the carriers;

FIG. 5 is a plan view of the selection member in matching position with the coded carrier after formation of an interengagement or key combination between the code pins and the slots of the reading bar;

FIG. 6 is a perspective view of a modified form of the apparatus illustrated in FIG. 1, with the slots on the carrier and the pins on the reading bar;

FIG. 7 is a plan view of a carrier and a reading bar on a selection member capable of transmitting energy from a particular carrier to actuate a separate mechanism, here a solenoid operated diverter;

FIG. 8 is a plan view of the apparatus illustrated in

Figure 10:
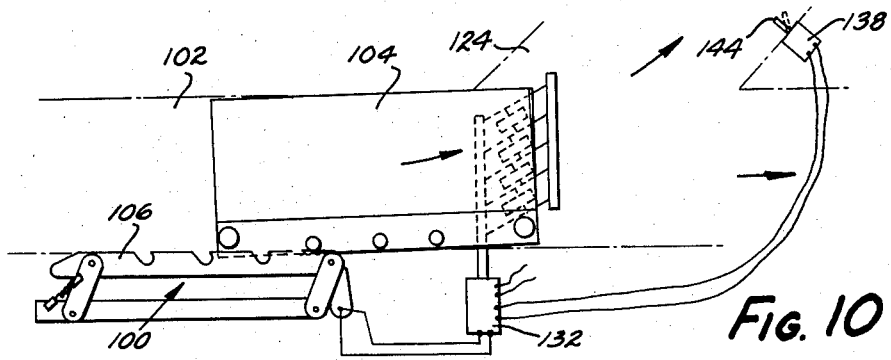
Figure 12:
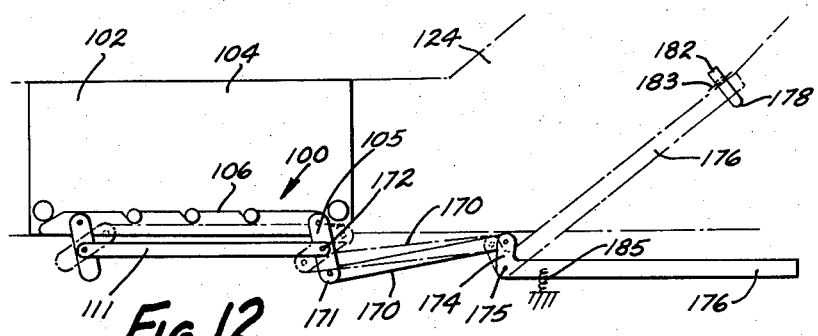
Figure 11:
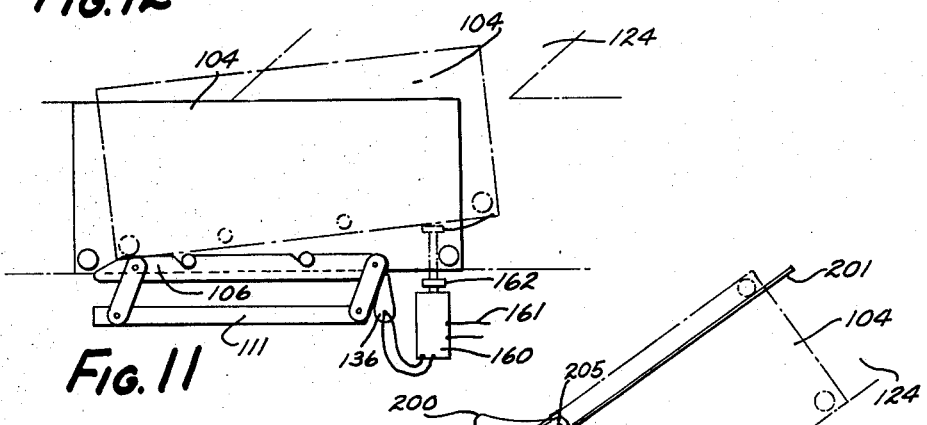
Figure 13:
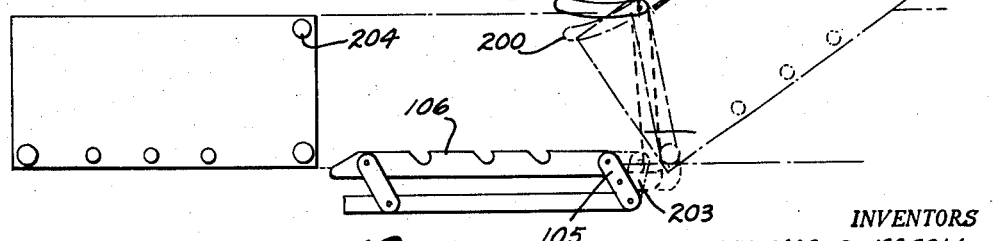
Figure 14:
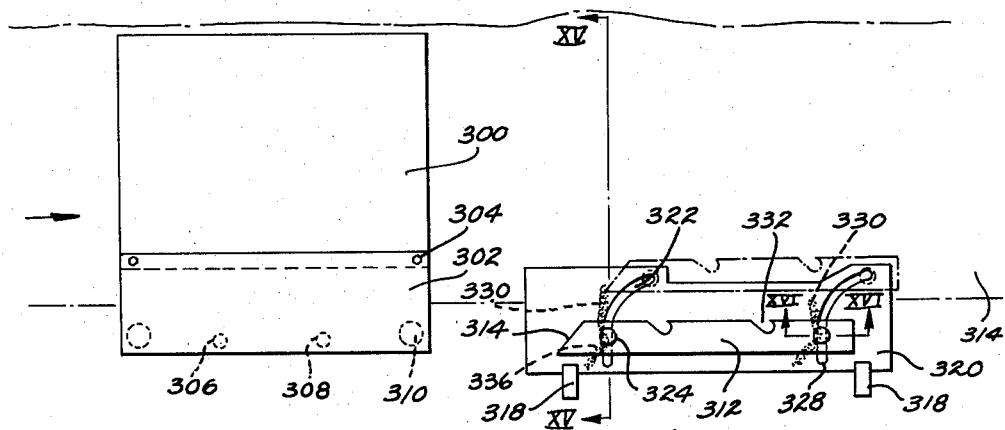
Figure 15:
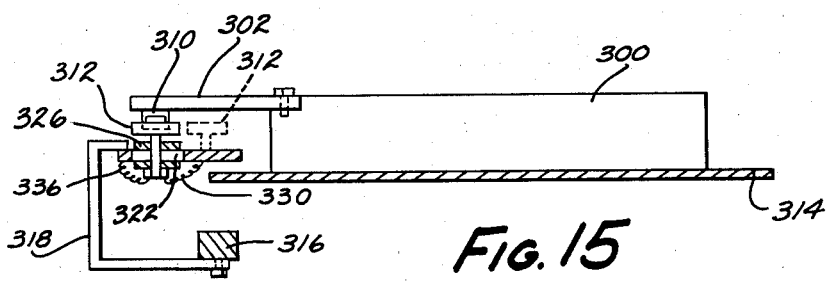
Figure 17:
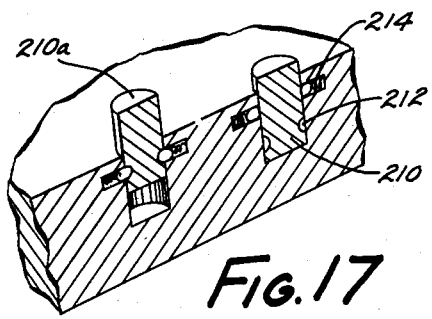
Figure 16:
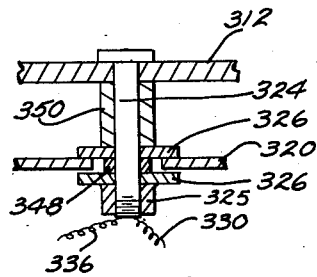
Figure 18:
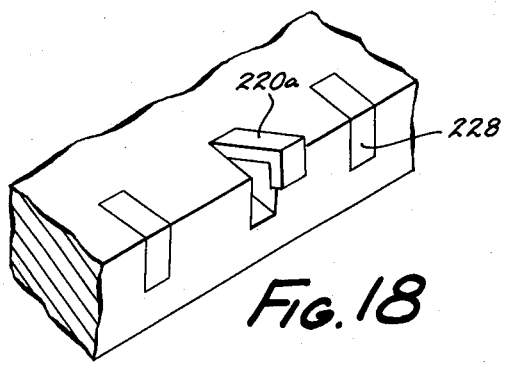

FIG. 7 with the carrier having contacted and depressed the reading bar of the selection member;

FIG. 9 is a plan view of the apparatus illustrated in FIG. 7 after a key combination or interlock of the carrier and selection member has occurred to actuate the solenoid operated diverter mechanism;

FIG. 10 is a plan view of the apparatus illustrated in FIG. 7 showing the actual diverting action;

FIG. 11 is a plan view of the interlocking type of selection member illustrated in FIG. 7 as used in combination with a simple solenoid operated push off diverter;

FIG. 12 is a plan view of the interlocking selection member illustrated in FIG. 7 used in combination with a mechanical, swinging, deflector bar actuated by energy transmitted through the selection member from the carrier;

FIG. 13 is a plan view of the device illustrated in FIG. 7 in combination with a pivoted mechanical diverting flange;

FIG. 14 is a plan view of a conveyor, code bearing carrier and selector member movable longitudinally and laterally and mounted in a modified manner on a slotted plate;

FIG. 15 is a sectional view taken on plane XV—XV of FIG. 14;

FIG. 16 is a fragmentary sectional view of the pin and slot arrangement in the apparatus of FIGS. 14 and 15 and taken on plane XVI—XVI of FIG. 14;

FIG. 17 is a fragmentary perspective view depicting one type of code selection means usable on the carriers or articles conveyed; and FIG. 18 is a fragmentary perspective view of a second type of code selection means.

Basically, the invention comprises a reading and selection apparatus for carriers on conveyors. The pre-set code of each passing carrier associates with the mechanical selection member, and upon the formation of a key-combination or interengagement between the pre-set code of a particular carrier and the selection member, a reaction occurs in the selector. This reaction then passively permits the operation of a mechanism, or actively operates a separate mechanism, especially a laterally shifting or diverting mechanism. The selection member may be biased into reaction to expose a diverting means, or it may be forcibly moved by the carrier itself to activate another mechanism. If desired, the selection member may simply react to effectuate a counting function, a loading operation, or another reaction instead of the diverting operation. The selection member preferably constitutes one leg of a pantograph or parallelogram. Alternatively it may be mounted on a structurally different base to effect a generally similar movement. The reading function is by association of spaced orifices or slots with spaced projections.

Referring now to FIG. 1, in the form of the invention illustrated, the reading and selection bar 12 forms one leg of a pantograph resembling four-bar linkage or parallelogram 10. This four-bar linkage, like other four-bar linkage arrangements includes one fixed support from which three legs are pivotally mounted to move in the form of a parallelogram through an arc. The four legs 12, 14, 16 and 17 are pivotally linked together at points 18, 20, 22 and 24 so that reader member 12 may move longitudinally and laterally with respect to fixed leg 17 by means of intermediate pivotal links or means 14 and 16. The fixed leg 17 is clamped to a stationary part 15 of the conveyor 19 as by brackets 23 and 25 (FIG. 3). Suitable bolts 27 secure the brackets into threaded openings (not shown) in the bottom of bar 15. Thus the entire linkage may be quickly and simply removed by removing bolts 27, and mounted at another place on the conveyor. A compression spring 42 is secured between link or leg 14 and fixed leg 17 to bias reader leg 12 outwardly toward the conveyor 19. A second compression spring 50 is mounted between diverting flange 48 and leg 17 to bias the flange outwardly toward the reader bar and against a stop 49 (FIG. 3). The brackets 43 and 25 extend outwardly away from the conveyor and hold the selection bar 12 above the level of the conveyor 19 so that when code pins of carriers pass through the reader slots in a manner to be described, the pallet or carrier will pass underneath the reader bar and its supporting fixed leg 17 with the top portions of pins 36, 44 and 46 contacting flange 48 as shown in phantom in FIG. 2. Bracket 25 may be placed on the far side of branch conveyor 58 to prevent interference with a diverted pallet. Of course these brackets may be substituted by other suitable supporting devices. It will be seen that the top surfaces of each of the pins is slightly lower than the tops of the corresponding slots, with these surfaces being substantially on a lower level than the bottom surface of fixed leg 17. Rear pin 37 is substantially lower, as is its corresponding slot, than the other pins for a purpose to be described.

In the surface of leg 12, here the lower surface, are the series of slots 23, 26, 28 and 30 forming the essential part of a code reading and selection means. It will be readily observed that the term "code" when used in the context of this invention, designates a plurality of prearranged elements capable of matching or not matching a series of cooperative prearranged means on the "reader and selection bar." The matching is called a "key combination." Accordingly, the "reading" function is a physical association between the bar and the "code means" on the carriers, such that, if the cooperative sets of "code means" and the "code reading means" on the "reading bar" match, a "selection" can occur. Although some of these terms are used in a manner slightly different from the usual usage thereof, their usage is intended to be within the confines of their function and nature as set forth in the context of this invention. Parallelogram 10 is mounted close enough to conveyor 19 to extend into the path of an oncoming pallet or carrier 32. The leading edge of parallelogram linkage 10 is equipped with a cam surface 34 for contact with a cooperating and preferably fixed lead cam or pin 36 on the carrier. A second fixed pin 37 is located on the rear corner of the pallet. As carrier 32 contacts surface 34 through pin 36, the reader member is shifted sideways or depressed out of the carrier's path against the bias of compression spring 42. The reader bar 12 is guided in its movements by its mounting means or links as depicted in FIG. 4 so that pin 36 rides along edge 40 of reader bar 12. Pin 36 is higher than slot 23 and larger than slots 26 and 28 and thus rides smoothly past them. Movement of the reader bar depresses the guide flange 48 of lead-off guide 56 about pivot 52, away from stop 49 against compression spring 50. As carrier 32 moves along, the pins carrying the code information associate for a limited time period with surface 40. If the code projections or pins do not match or i.e. form a key combination or interengagement with the slots, the carrier continues to move past the parallelogram linkage, along on conveyor 19, and allows the mechanism to resume its normal extended position depicted in FIGS. 1 and 2. The middle adjustable code pins 44 and 46 will not snag in subsequent slots since if all the pins do not match corresponding slots, the follow-up pin 37 depresses the bar 12 after the limited reading period and the other several pins are then no longer in contact with the bar. If the last pin 37 happens to pass through slot 30 it will merely pass under the diverting arm 48 unaffected since its top surface is lower than the bottom surface of flange 48. If pins 36, 44, 46 and 37 are complementary to slots 30, 28, 26 and 23, compression spring 42 will cause parallelogram linkage 10 to react and be biased to the extended position with the pins passing through the slots of reading bar 12 to assume the relationship depicted in FIG. 5. Simultaneously, diverting guide flange 48 pivots outwardly on pivot 52 under the bias of compression spring 50 to intersect the path of the carrier and extend beyond the pins. The pins are thus trapped behind the guide flanges 48 and 56 and follow their rear surfaces to divert carrier 32 down the branch conveyor 58 as depicted in phantom in FIG. 5. It will be recognized that any other receiver may be substituted for the branch conveyor 58 such as a work table machine or storage conveyor. Since the pallet may tend to swing around after it is trapped, a suitable guide rail 33 may be provided on the opposite side of conveyor 19. Various other ways to prevent this are possible but a listing of them would be superfluous in describing the inventive concept.

In effect, therefore, reader bar 12 of resembling linkage 10 guards diverter 48 until a matching of the preselected code with the code reading means of the four-bar linkage occurs, at which time it passively allows the previously guarded mechanism to shift into active position. The code may be changed by placing the pins in any of the openings 45. Any number of such openings may be provided to effectuate hundreds of various combinations with the pins. The conveyor may be either the powered type or the gravity type. The code and code reading mechanism may also be widely varied to adapt to a particular situation, article, conveyor type, or space limitation. One example of such a variation is depicted in FIG. 6 to suggest the practically unlimited number of possibilities. Here the code reading bar 59 of linkage 60 includes code pins 62 and 64 which associate with surface 66 on carrier 68. The lead peg 70 depresses the linkage 60 by contact with camming surface 72 against the bias of compression spring 74 mounted between leg 61 and fixed leg 63. Diverting flange 76 contacting linkage 60 through upwardly extending pin 78 is simultaneously depressed. Pins 62 and 64 may be varied in position on the linkage to correspond with variously positioned slots 80 and 82 on carrier 68 such that a mismatching of the pins and slots has no effect on the carrier. If they do not match when exposed to each other, the slotted carrier continues along the conveyor. Snagging of pins such as 62 in various slots such as 80 is prevented since follow-up pin 87 on the carrier contacts surface 72 and depresses the arm 59 away from the slots after the limited exposure period for reading. This causes the reader to make only one reading for each passing carier, after which the reader bar is held depressed to prevent further contact and possible jamming of pins and slots. Follower pin 87 will not catch in depression 89 since the former extends below the latter. A matching of the pins and slots causes an interengagement, with linkage 60 being extended to allow guide flange 76 pivoting at 86 to intersect the carrier path and catch behind short pin 85 which passes through depression 89 in bar 59. With the extension, pins 62 and 64 follow along longitudinal slot 84. When pin 85 catches behind pivotal guide flange 76 leading to fixed flange 92, follow-up pin 87 has not quite reached surface 72 and thus neatly passes behind the bar 59. Connecting links 61 may be downwardly offset to allow pin 87 to pass without interference. A suitable guide rail 69 may be placed on the opposite side of the conveyor to prevent the hooked pallet from swiveling on the conveyor. This structure may be modified in various ways depending upon the circumstances. The code insert 65 may be substituted as desired to variously space the code slots.

It should be noted that in some instances it may be more desirable to laterally displace the pallet only a limited amount by the diverting mechanism until the pallet passes completely by the selector device, and then completely divert the pallet.

It will readily be seen that the basic operational unit may be used as a mere reading and detection device, or as a counting mechanism, or to allow an independent timing sequence to begin or end, or to actuate a loading mechanism, or in a number of other combinations.

The coded carriers used in combination with the reading bar may be flat pallets, tote boxes, buckets, trays, simple message carriers, production articles placed on the conveyor itself and capable of receiving a code, or any other of many possible carrier structures. The term carrier is thus intended to include such varied forms of devices.

In FIG. 7 is depicted an interlocking type reader bar 106 on a parallelogram 100 comprising legs 106, 107, 109 and fixed leg 111. Reader bar 106 is biased outwardly by compression spring 113 mounted between legs 109 and 111. Reader bar 106 includes a cam surface 122 for cooperation with lead pin 120 on carrier 104 to depress the parallelogram 100. Blind slots 108, 110 and 112 in the face of bar 106 facing the conveyor 102 read the codes on passing carriers and form a key combination or interengagement with a particular carrier 104, and more particularly with the code pins thereof 114, 116 and 118 to form an interlock therewith. Mounted adjacent conveyor 102 and in the proximity of conveyor branch 124 is a separate diverting mechanism 126 comprising spaced vertical wheels 128 in frame 130 operated by solenoid 132 from a suitable electrical power source (not shown) to which electrical leads 134 connect. The solenoid is actuated through a switch in pivotal lever 136 and is deactuated through reset switch 138. Referring to FIG. 8, the lead camming pin 120 on the passing carrier 104 contacts and depresses leg 106 of pantograph 100. The reading means or slots of the pantograph associate with the code pins on carrier 104 since pantograph 100 is biased outwardly against the carrier by compression spring 113. This association or reading occurs after pin 120 passes the forward end of the member 106 and before pin 121 contacts surface 122. These fixed indexing pins are spaced apart at a distance approximately the same or a little greater than the effective engaging length of the reader member so that only one reading occurs, after which the bar is held depressed away from the code pins by pin 121. If pins 114, 116 and 118 match slots 108, 110 and 112, they will form a key combination and interlock as depicted in FIG. 9 to positively and forcibly move leg 106 longitudinally forwardly and laterally outwardly with respect to the fixed leg 111. As leg 106 shifts forwardly, connecting leg or link 107 contacts and pivots lever 136 against a tension spring connecting lever 136 with fixed leg 111 to close the switch and activate solenoid 132 through electrical leads 134. Shaft 140 of solenoid 132 is then retracted (FIG. 9) to cause the suspended diverter wheels 128 to be slanted toward branch conveyor 124. Further movement of the carrier causes a release of the pins from the matching slots as depicted in FIG. 10 to allow pantograph 100 to return to its original position depicted in FIG. 7. Its return is caused by spring 113 which acts also as a tension spring when the pantograph is in its most extended position. Wheels 128 then cause the carrier 104 to be routed down branch conveyor 124. They are held in this diagonal position, until carrier 104 contacts switch arm 144 of reset switch 138, by any suitable means such as a conventional relay (not shown) which will hold the solenoid 132 in retracted position until switch 138 is tripped. Tripping of switch 138 causes solenoid 132 to become deactivated to allow the wheels 128 to assume the normal position depicted in FIG. 7.

Obviously, the particular combination of pins and slots, or more generally projections and recesses, or their equivalent counterparts, may be varied greatly in their geometrical arrangement without departing from the scope of this invention. By changing the spacing of the respective pins or slots, the carrier may be made to pass several, or even several dozen, pantograph reading and selection devices before meeting the matching one to thus be diverted from the conveyor. Variable slot spacing may be obtained, for example, by sliding a suitable plate or guard over particular slots while allowing others to remain uncovered for co-action with a pre-set code of pins. The code pins may be varied by moving the pins into various receivers provided in the carrier or may be merely raised and lowered into the desired positions as depicted in FIGS. 17 and 18 and explained more fully hereinafter. Not only may the position of the pins be varied but the number may also be varied to produce a wide variety of codes.

In FIG. 11 is depicted a simpler type of diverting mechanism operated by parallogram four-bar linkage 100. Here again lever 136 closes the circuit to actuate a solenoid 160 connected by leads 161 to a power source, and upon the formation of an interlock causes bumper 162 to be extended as depicted in phantom in FIG. 11. This bumper then shifts a carrier 104 laterally onto branch conveyor 124.

The interlocking type pantograph may not only be used to close an electrical circuit to operate a solenoid or to shift a fluid control valve to operate a fluid motor, but may be used to transmit a large amount of energy from a carrier moving on a gravity conveyor, or from a power conveyor through the carrier, to a separate mechanical apparatus. Thus, by virtue of this simple, slotted, shiftable bar, a separate power source is made unnecessary for the operation of such things as trap doors for loading pallets, dumping platforms for tote boxes, diverting deflector bars or any other desired mechanism. In FIG. 12, the interlocking type reader bar 106 on pantograph 100 is shown as forming a key combination or interengagement with the code pins of carrier 104 to shift the bar 106 laterally and longitudinally. Here legs or links 105 are pivoted to fixed leg 111 in their center. End 171 of the forward link is pivotally attached to link 170 which in turn is pivoted to dog leg 174 of deflector bar 176. Bar 176 is pivotally mounted to a fixed support (not shown) at 175 to swing across conveyor track 102 as depicted in phantom.

The interlock as shown in FIG. 12 has just been formed so that as leg 106 shifts forwardly it will pivot link 105 on its center to retract link 170 and swing deflector 176 across the conveyor as shown in phantom. The deflector catches in an upsidedown hook catch 178 which holds the deflector until carrier 104 is diverted onto branch 124 and depresses end 182 to vertically swivel hook 178 upwardly about horizontal pivot 183. This causese the release of the deflector whereby it returns under the bias of tension spring 185 to its normal position.

This deflector bar diverter may be substituted by any other suitable diverter mechanism, most of such devices not being new per se with the inventors hereof but being illustrative of the possible combinations which may be made with the reading bar.

Another type of mechanical diverter which is operated by means of the reading bar harnessing energy from a particular passing carrier is that depicted in FIG. 13. Here, the interlocking type reading bar 166 receives a particular complementary code in a message key and is shifted by energy from the coded carrier or its conveyor to shift lever 202 which includes dog leg 203 attached to the center of link 105. Lever 202 also includes guide flange 200 adjacent elongated guide rail 201 such that upon the formation of a key combination, legs 106 and 105 are shifted to pivot lever 202 about point 205 to trap pin 204 on carrier 104 behind guide flange 200 to divert the carrier down branch conveyor 124 as depicted in phantom.

In FIGS. 14 and 15 is depicted a modified form of a selector member or bar wherein the bar is mounted on a slotted plate to have a longitudinally and laterally movable operation with respect to the conveyor, but which is not mounted as one leg of a pantograph.

In this structure, the carrier 300 includes an overhanging messenger or code plate 302 attached to the carrier by suitable bolts 304 and having downwardly depending code pins 306 and 308, lead cam pin 310 and follower cam pin 307. Adjacent conveyor 314 and mounted to a portion thereof, i.e. bar 316 (FIG. 15), through brackets 318 is a plate 320 having arcuate slots 322 which curve longitudinally and laterally with respect to the conveyor. A pair of pins 324 comprising bolts depend from the reader bar 312 and extend through slots 322 to ride therein in the arcuate paths. Nuts 325 secure the bolts. A pair of supporting and bearing washers 326 separated from each other by spacer 348 and from reader 312 by spacer 350 ride on plate 320 to support the reader bar at a spaced distance above the conveyor 314 (FIGS. 15 and 16).

As the carrier moves to the right (FIG. 14), camming pin 310 contacts cam surface 314 and depresses the reader bar 312 away from conveyor 314 so that pins 324 move to the ends 328 of the slots 322 against the bias of tension springs 330 secured between the pins and the front edge of fiixed plate 320. As pin 310 passes the reader, code pins 306 and 308 temporarily associate with the reader slots. If pins 306 and 308 match the slots 332 in the reader bar 312, they interlock with the bar 312 being shifted under force of the carrier to shift the bar into the position shown in phantom in FIGS. 14 and 15. The latter part of this shifting occurs against the bias of tension springs 336 secured between the pins 324 and the back edge of plate 320. The slots shown involve a large amount of lateral movement to clarify the operation but only a small arc need be traversed. With the shifting of the reader bar, any electrical switch, mechanical linkage, or other separate mechanism (not shown) may be actuated as shown for example in connection with the pantograph based reader bar. After the shift into the extended position, the code pins disengage from the slots and reader bar 312 springs back to the position shown in FIG. 14 where it is held in equilibrium by the opposite springs 330 and 336. It will thus be seen that the basic operational movements of this bar are very similar to that of the bar forming part of the pantograph.

One of the primary objectives of this invention is to provide means which will accurately select one carrier from a plurality of carriers for diversion at a particular station. It is also an object of this invention to make the station at which diversion will occur readily changeable by changing the code on the carrier. It is thus preferable that the code determining and carrying means, for example the pins 44 and 46 (FIG. 2), be easily and rapidly changed from one pattern to another. These pins as well as the slots in the reader bar may be many in number to accommodate a vast number of code selections. Two different types of such coding pin arrangements are shown in FIGS. 17 and 18.

In FIG. 17 code pins 210 include peripheral pockets 212 for co-action with the spring loaded detents 214. Thus, upon raising a pin such as the pin 210a, these detents hold the pin in extended position for association with the code reading pantograph. The depressed pins, such as pin 210, will be inoperative because they will pass below the reading bar. If desired, the projections 220 depicted in FIG. 18 may be utilized. These are mounted on a rear pivotal support (not shown) to allow easy and rapid setting of the projections into active position such as that illustrated by projection 220a for association with a reading pantograph. Again a suitable spring loaded detent may be used to hold the projection in action position.

It will be recognized that the illustrated structures presenting the basic concept may be modified in various ways depending upon the particular materials to be conveyed, the type of conveyor, the type of carrier utilized, and many other factors. It will also be obvious that the basic reading mechanism disclosed may be utilized for many functions in addition to shifting or diversion of the carrier itself. More specifically, the reading pantograph may be used to actuate loading mechanisms and the like as well as unloading and diverting mechanisms. Moreover, the pantograph may be used to deactivate or activate additional equipment normally associated with conveyors, manufacturing processes, and the like such as timing or sequencing equipment. In addition, the carrier members may be merely message or code carriers instead of load carriers. Further, they may be applied to overhead as well as floor conveyors. Thus, the scope of this inventive concept is not intended to be limited to the illustrative material disclosed, but only by the scope of the appended claims and the reasonable equivalents thereto.

We claim:

1. A selection device for a conveyor mechanism comprising a reader bar and means mounting said bar longitudinally along said conveyor for movement in an arcuate path both longitudinally and laterally of said conveyor; a plurality of code bearing carriers on said conveyor; each of said carriers including a plurality of code elements arranged in predetermined spacing to represent in combination a code message; mechanical code reading means on said reader bar comprising a plurality of openings of predetermined spacing along said bar facing said conveyor and carriers and physically associating with pre-set code elements on each of the passing code carriers to form a physical reading coaction therewith; the openings of said code reading means forming an interengagement with the code elements of only a predetermined pre-set code associated with a particular carrier and said reader bar reacting and shifting both longitudinally and laterally only upon the formation of an interengagement between said code and said code reading means, and remaining in a reading condition in the absence of such an interengagement; said shifting of said reader bar being caused by force transmitted from said particular carrier due to said interengagement; said bar and code elements moving out of physical reading contact in the absence of an interengagement to allow the carrier to pass without major shifting of said bar.

2. A selection device for conveyors, said conveyors transporting article carriers, said device comprising, a reading member mounted adjacent said conveyor for movement both longitudinally and laterally of said conveyor; pre-arranged elements on said article carriers and reading means on said reading member; said reading member being shifted slightly transversely of said conveyor by each carrier as it passes said reading member to physically associate said reading means with said pre-arranged elements on each carrier; said elements and said reading means each being components of represented predetermined key combinations, effecting interengagement therebetween when complementary; said reading member moving longitudinally and laterally only upon the occurrence of said interengagement, and remaining in its reading condition in the absence of such an interengagement; and carrier engaging means acting upon said carrier when said elements and said reading means interengage; said bar and code elements moving out of physical reading association with each other in the absence of said interengagement to allow the carrier to pass said member without major shifting of said reading member.

3. A carrier selector device for a conveyor mechanism comprising: a four-bar linkage having four legs arranged in a parallelogram; one leg of said linkage being fixedly mountable with respect to said conveyor mechanism; code reading means on said linkage associating with pre-set codes on passing carriers; said reading means comprising a plurality of selectively spaced receiving openings for reading carrier codes comprising a plurality of projections; said openings forming a key combination engagement with a predetermined set of code projections on a particular predetermined carrier and said linkage being extended only upon the formation of a key combination engagement, and remaining in an unextended reading condition in the absence of a key combination engagement.

4. A carrier selector for a conveyor comprising: a four-bar linkage having four legs arranged in a parallelogram; one leg of said linkage being fixedly mountable with respect to said conveyor; code reading means on said linkage associating with pre-set codes on carriers passing on said conveyor; said reading means forming a key combination interengagement with a pre-set code on a particular predetermined carrier; a carrier shifting means associated with said conveyor and said linkage; said linkage positioned with respect to said shifting means so as to be normally guarding said shifting means from passing carriers to prevent its interaction with carriers until said key combination is formed and allowing said shifting means to interact wtih a carrier upon the formation of said interengagement to enable said shifting means to shift said particular predetermined carrier with respect to said conveyor.

5. A carrier selector for conveyors comprising: a four-bar linkage having four legs arranged in a parallelogram; one leg of said linkage being fixedly mountable with respect to a conveyor; the remaining portion of said linkage extending toward said conveyor and having a reading bar; code reading slots on said reading bar associating with pre-set projection type code bearers on carriers passing on said conveyor; said reading bar forming a key combination with a pre-set code on a particular carrier to create an interengagement; a carrier shifting means associated with said conveyor and said linkage; said linkage normally being depressed by passing carriers to prevent said shifting means from acting upon said carriers; said linkage being biased to extend from said depressed condition only when said code of a particular carrier and said code reading slots of said reading bar are complementary, and said shifting means moving with extension of said linkage into the path of said particular carrier to engage said particular carrier.

6. Selector means for carriers moving along a conveyor, said selector means comprising: a reader means fixedly mounted with respect to said conveyor; said reader means having a reader member equipped with code reading pins; each of said carriers having code bearing slots thereon positioned to move against said reading member to shift said reader slightly into a reading condition; said reader member substantially shifting only when said code bearing slots are complementary with said code reading pins, and remaining in a reading condition during carrier passage when said code bearing slots are not complementary with said code reading pins; carrier diverter means mountable along said conveyor; means operatively connecting said reader member and said carrier diverter means for activating said carrier diverter means upon substantial shifting of said reader member when said code bearing slots and said code reading pins are complementary.

7. Selector means for carriers moving along a conveyor, said selector means comprising: a reader member fixedly mounted with respect to said conveyor; said reader member having a reader bar equipped with code reading slots; each of said carriers having code members thereon positioned to move against said reader bar to shift said reader bar slightly, and temporarily position said code members and slots into reading relationship to determine whether said code members are complementary with said code reading slots; said reading bar interengaging said carrier and shifting substantially with and by reason of the movement of said carrier only when said code reading slots and said code members are complementary, and remaining in a slightly shifted reading position until passage of said carrier when said slots and members are not complementary; carrier diverter means mountable along said conveyor; and a linkage operatively connecting said reader member and said carrier diverter means for activating said carrier diverter means upon substantial shifting of said reader member when said code members and said code reading slots are complementary.

8. Selector and diverting apparatus for carriers on a conveyor comprising, a four-bar linkage reader having four legs arranged in a parallelogram and having one leg fixedly mounted with respect to said conveyor; code bearing carriers on said conveyor; code reading means on said linkage associating with preset codes on each of said carriers passing on said conveyor; said reader means forming an interlock only with particular carriers by the formation of a key combination therewith with matching of a particular code with a particular reading means; said linkage, only upon the formation of said interlock, being substantially, positively and forcibly shifted with respect to said one affixable leg by energy of said particular carrier; carrier diverter means adjacent said conveyor; and said diverter means being activated by said substantially shifted linkage to laterally divert said particular carrier.

9. A selection device for a conveyor mechanism comprising, a reader element mounted alongside a conveyor for movement both longitudinally and laterally of said conveyor; code reading means on said reader element associating with preset code associated with passing code carriers; said element being initially and normally held in an intermediate position between a depressed reading position and an extended reacting position; biasing means applying a first biasing force upon said reader element upon its depression and a second biasing force upon its extension to bias said reading element to its intermediate position; said reader element being depressible into a depressed code reading condition against said first biasing force by passing code carriers; said code reading means forming an interengagement with a predetermined preset code associated with a particular carrier causing said reader bar to react and shift from said depressed condition and move laterally and longitudinally of said conveyor through said initial position and further against said second biasing force to react upon said particular carrier; said element being biased by said second biasing force to return to its initial position after being acted upon, to enable association with additional carriers; said reader element remaining in said depressed condition until the carrier passes in the absence of an interengagement, and said element being biased by said first biasing force from said depressed condition to its initial position after the carrier passes.

References Cited in the file of this patent

UNITED STATES PATENTS

| | | |
|---|---|---|
| 1,503,936 | Benoit | Aug. 5, 1924 |
| 1,556,723 | Shaffer | Oct. 13, 1925 |
| 1,804,154 | Cowley et al. | May 5, 1931 |
| 2,253,572 | Mitchell | Aug. 26, 1941 |
| 2,876,888 | Auliffe et al. | Mar. 10, 1959 |
| 2,931,484 | Muller et al. | Apr. 5, 1960 |